L. G. TOLLSTAM.
STABILIZING WHEEL FOR MOTOR CYCLES.
APPLICATION FILED APR. 7, 1915.
1,177,290.
Patented Mar. 28, 1916.
2 SHEETS—SHEET 1.
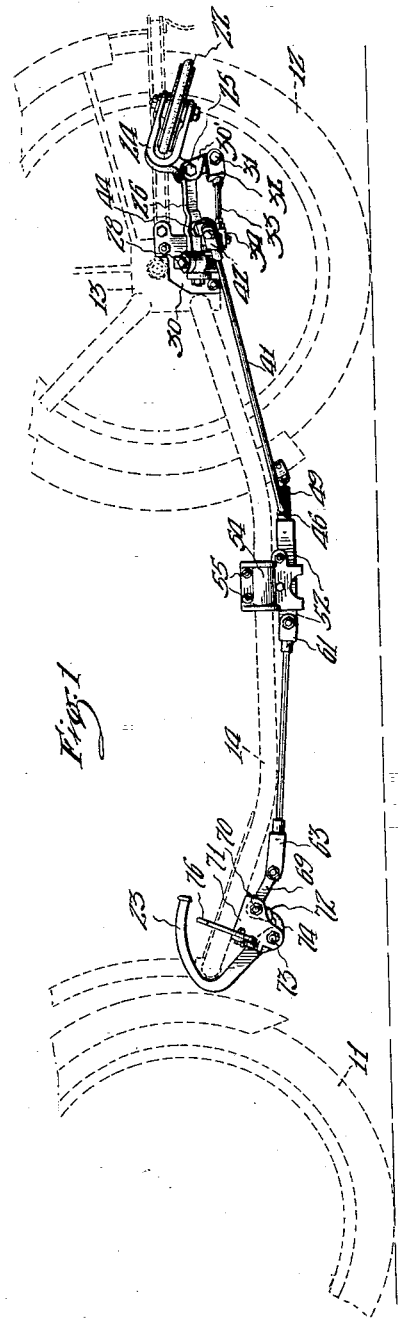
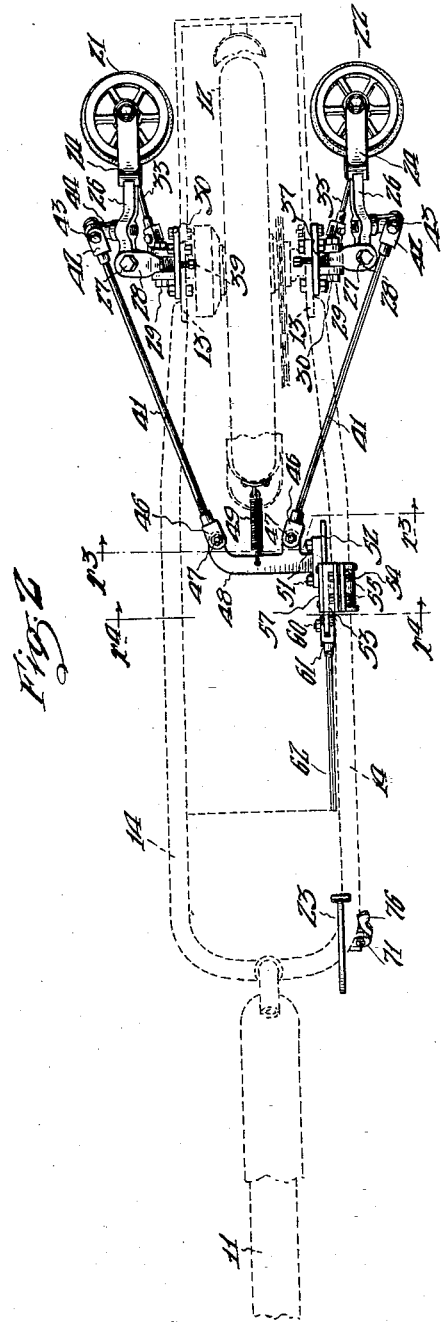

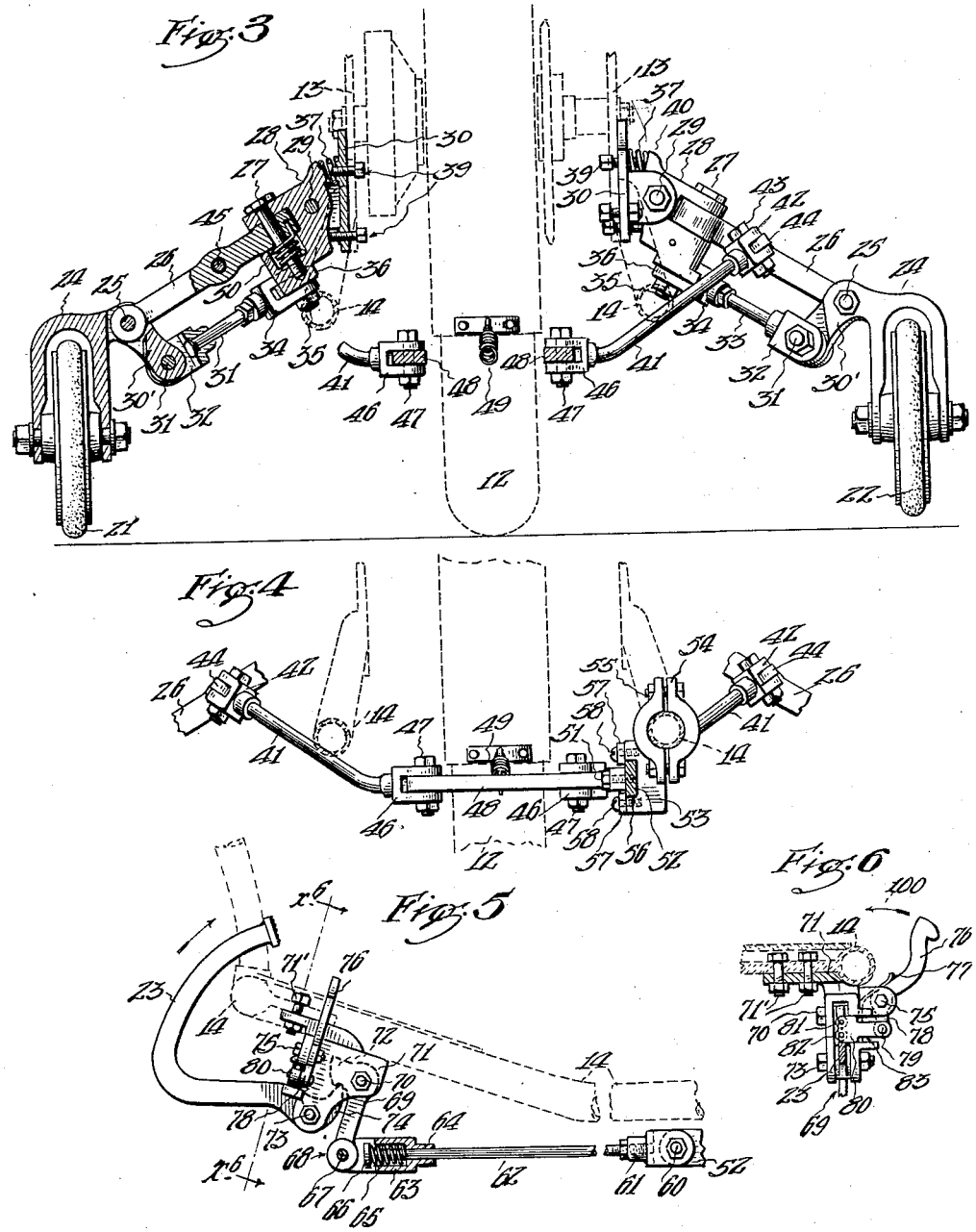

UNITED STATES PATENT OFFICE.

LOUIS G. TOLLSTAM, OF LOS ANGELES, CALIFORNIA.

STABILIZING-WHEEL FOR MOTOR-CYCLES.

1,177,290.  Specification of Letters Patent.  Patented Mar. 28, 1916.

Application filed April 7, 1915. Serial No. 19,807.

*To all whom it may concern:*

Be it known that I, LOUIS G. TOLLSTAM, a citizen of the United States, residing at Los Angeles, in the county of Los Angeles and State of California, have invented a new and useful Improvement in Stabilizing-Wheels for Motor-Cycles, of which the following is a specification.

My invention relates to motorcycles.

As ordinarily constructed motor cycles consist of two wheels in series, the rear wheel being driven by an internal combustion engine. When in motion, a motor cycle tends to balance itself, but when moving very slowly, or when at rest, it tends to topple over, it being necessary at such times for the rider to place his foot on the ground for the purpose of steadying the machine. This is not a serious objection in operating on country roads, but the operation of motor cycles on city streets in dense traffic is a difficult and tiresome matter, as it is necessary for the operator to frequently stop and start, and consequently necessary for him to support the machine a portion of the time by resting one foot on the ground. This difficulty has become more pronounced as the weight of motor cycles has been increased of late years, and some of the larger machines are very difficult to manipulate on crowded streets.

The principal object of my invention is to provide an attachment for a motor cycle which will hold it upright when the motor cycle is at rest, or moving slowly, so that the operator can devote his entire attention to the machine without the necessity for placing his foot on the ground for balancing purposes.

A further object of the invention is to provide an attachment which the operator can fold up out of the way when it is not in use.

Further objects and advantages will be made evident hereinafter.

Referring to the drawings, which are for illustrative purposes only: Figure 1 is a side elevation showing a portion of a motor cycle with the invention applied thereto, and the balancing wheels in the raised position. Fig. 2 is a plan view of the apparatus shown in Fig. 1. Fig. 3 is a section on the plane $x^3$—$x^3$ of Fig. 2, looking in the direction of the arrows, but with the balancing wheels in their lowered position. Fig. 4 is a section on the plane $x^4$—$x^4$ Fig. 2, looking in the direction of the arrows. Fig. 5 is an elevation of the forward portion of the apparatus shown in Fig. 1, with the pedal in the position it assumes when the wheels are lowered. Fig. 6 is a section on the line $x^6$—$x^6$ of Fig. 5.

In the drawings, a front wheel 11 is pivotally mounted in the frame of the motor cycle, and a rear wheel 12 is rigidly journaled in said frame. The frame is provided with side plates 13 to which the bearings for the rear wheel are secured, and side bars 14 extend between the wheels 11 and 12 forming the lower portion of the frame and also forming a support for the foot boards not shown, the above parts being common to several types of motor cycles and forming no part of the present invention.

The invention consists broadly of balancing wheels 21 and 22 which are preferably provided with rubber tires, these wheels being raised and lowered through a series of rods from a pedal 23, this pedal being provided with a latching mechanism so that the wheels may be locked in their lowered position as shown in Fig. 3, these wheels being provided with spring means for normally holding them in their raised position as shown in Figs. 1 and 2.

The wheels 21 and 22 are mounted on axles carried by forks 24, these forks being pivoted on a wrist pin 25 carried on pivot links 26 which turn freely on pivot pins 27 secured in pivot castings 28. The pivot castings 28 are pivoted on hinge pins 29 carried in brackets 30 secured to the side plates 13. The forks 24 have thrust projections 30' formed thereon, these projections carrying a thrust pin 31 on which a clevis 32 is pivoted, this clevis being secured to a thrust rod 33, the thrust rod 33 having a second clevis 34 which is pivoted on a thrust pin 35 carried on a thrust projection 36 formed on the pivot casting 28. A compression spring 37 is placed about one of two set screws 39 between a projection 40 on the pivot casting 28 and the bracket 30, this compression spring tending to force the projection 40 away from the base of the bracket 30. The set screws 39 are for limiting the movement of the projection 40 with relation to the bracket 30. On either side of the machine rear rods 41 are placed, these rods having clevises 42 pivoted on pins 43, these pins being carried on pivoted members 44 which are secured in holes 45 in the links 26, the rear rods 41 extending forward and being provided with clevises 46 which are pivoted on pins 47 carried on a cross head 48.

The cross head 48 is provided with a pull back tension spring 49 secured to the frame of the motor cycle in such a manner as to tend to draw the cross head 48 in a rearwardly direction. Surrounding the pivot pins 27 are torsion springs 50 so arranged that they tend to move the wheels 21 and 22 into the raised position as shown in Fig. 1 and Fig. 2. The cross head 48 is secured by means of bolts 51 to a slide 52, this slide moving freely in a guide casting 53 and being secured by means of a cap 54 and bolts 55 to one of the side bars 14. The guide casting 53 has a slot 56 formed therein in which the slide 52 is free to move, the slide being held in this groove by means of plates 57 and screws 58. Secured to the forward end of the slide 52 by means of a bolt 60 is a clevis 61 which is secured to a front rod 62. The rod 62 extends forwardly, sliding freely in an opening 64 in the end of a clevis 63. A compression spring 65 surrounds the rod 62, the rod 62 having a head 66 formed thereon, the spring 65 forming a resilient connection between the rod 62 and the clevis 63. The clevis 63 is pivoted on a pin 67 carried on a lever 68 of a hook member 69. The hook member 69 is pivoted on a pin 70 carried by a casting 71 which is secured by means of bolts 71' to the frame of the motor cycle. The hook member 69 is provided with a hook 72. Carried on a pin 73 in the casting 71 is the pedal 23, the pedal having an end 74 adapted to engage the lever 68 and the hook 72. Pivoted on a pin 75 carried in the casting 71 is a latch lever 76. A flat spring 77 tends to hold the lever in the position shown in Fig. 6, this lever having a projection 78 carrying a pin 79 which is in turn secured in a catch 80, this catch having rollers 81 and 82 pivoted thereon and so located that they roll freely on the side of the pedal 23 to prevent binding thereof. The catch 80 slides in an opening 83 in the casting 71 and is so located that it is forced over the top of the pedal 23, by the spring 77, to its extreme lower position.

The method of operation of the invention is as follows: The parts being in the position shown in Fig. 1, the wheels 21 and 22 being held in their raised position by the springs 50 and the spring 49, the machine is ready for operation and may be operated like an ordinary motor cycle. When it is necessary to slow down or stop, as for example when the rider approaches a crossing in a crowded thoroughfare, the rider presses downwardly on the pedal lever 23, the projection 74 of that lever sliding over the lever 68 and engaging the hook 72, pulling the front rod 62 forward, pulling the cross head 48 forward, and exerting a tension on the rear rods 41. This pulls the wheels 21 and 22 forward. The location of the projection 36 is such that as the wheels 21 and 22 move forward, the pivot link 26 turning freely on the pivot pin 27, the forks 24 also turn around the wrist pin 25, the wheels being dropped into a position approximately vertical to the surface of the street. When the pedal 23 is pushed to its extreme lower position, the catch 80 is forced inwardly by the spring 77, securely locking the pedal 23 in its depressed position. The pedal 23 remains in this position and the wheels 21 and 22 are locked in their lower position as shown in Fig. 3, until the operator strikes on the side of the lever 76 with his foot, moving the lever in the direction of the arrow 100 shown in Fig. 6, thereby throwing the catch 80 out of engagement with the pedal 23 and allowing the springs 49 and 50 to throw the wheels 21 and 22 into their raised position as shown in Figs. 1 and 2.

The provision of the wheels 21 and 22 on either side of the rear wheel 12 changes the motor cycle to a stable vehicle, so that it is possible for the rider to move through crowded traffic without the necessity for frequent balancing. At the same time the wheels 21 and 22 can be folded up out of the way when not in use.

I claim as my invention:—

1. A stabilizing wheel and support for a motorcycle comprising a wheel, an axle for said wheel, a fork in which said axle is secured, a pivot link, a wrist pin for securing said fork to one end of said pivot link, means for pivotally securing the other end of said pivot link to the motorcycle frame, and means for swinging said pivot link with relation to the frame and simultaneously swinging said fork with relation to the pivot link.

2. A stabilizing wheel and support for a motorcycle comprising a wheel, an axle for said wheel, a fork in which said axle is secured, a pivot link, a wrist pin for securing said fork to one end of said pivot link, a pivot pin for securing the other end of the pivot link to the frame, means for swinging said pivot link backward and inward toward the frame about said pivot pin, and means for simultaneously swinging said wheel upward about said wrist pin.

3. A stabilizing wheel and support for a motorcycle comprising a wheel, an axle for said wheel, a fork in which said axle is secured, a pivot link, a wrist pin for securing said fork to one end of said pivot link, a pivot pin for securing the other end of the pivot link to the frame, a rear rod connected to a point on said pivot link intermediate of said pivot pin and said wrist pin, means for so actuating said rear rod as to swing said pivot link backward and inward about said pivot pin, and means for simultaneously swinging said wheel and fork upward about said wrist pin.

4. A stabilizing wheel and support for a motorcycle comprising a wheel, an axle for said wheel, a fork in which said axle is secured, a pivot link, a wrist pin for securing said fork to one end of said pivot link, a pivot pin for securing the other end of the pivot link to the frame, a rear rod connected to a point on said pivot link intermediate of said pivot pin and said wrist pin, means for so actuating said rear rod as to swing said pivot link backward and inward about said pivot pin, and a thrust rod so secured to said fork and to the frame of the motorcycle that said wheel and fork swing upward about said wrist pin as said pivot link swings backward and inward.

5. An operating mechanism for motorcycle stabilizing wheels comprising a support, a pedal pivoted on said support, an end extension formed on said pedal, a hook member so placed as to be engaged by said end extension on said pedal, and means for connecting said hook member with the stabilizing wheels.

6. An operating mechanism for motorcycle stabilizing wheels comprising a support, a pedal pivoted on said support, an end extension formed on said pedal, a hook member so placed as to be engaged by said end extension on said pedal, means for locking said pedal in one extreme position, and means for connecting said hook member with the stabilizing wheels.

7. An operating mechanism for motorcycle stabilizing wheels comprising a support, a pedal pivoted on said support, an end extension formed on said pedal, a hook member so placed as to be engaged by said end extension on said pedal, a latch lever pivoted in said support, a catch actuated by said latch lever and so placed that it locks said pedal in one extreme position, and means for connecting said hook member with the stabilizing wheels.

In testimony whereof, I have hereunto set my hand at Los Angeles, California, this 1st day of April, 1915.

LOUIS G. TOLLSTAM.

Copies of this patent may be obtained for five cents each, by addressing the "Commissioner of Patents, Washington, D. C."